Patented Apr. 17, 1928.

1,666,645

UNITED STATES PATENT OFFICE.

ALEXANDER FRIEDEN, OF MOUNT VERNON, NEW YORK, ASSIGNOR OF ONE-THIRD TO RAYMOND F. BACON, AND ONE-THIRD TO ALCAN HIRSCH, BOTH OF NEW YORK, N. Y.

RECOVERY OF CAMPHOR.

No Drawing.    Application filed March 7, 1927.  Serial No. 173,603.

My invention relates to improvements in the recovery of camphor from celluloid, similar nitrocellulose products, or the like. Heretofore various methods have been employed for the purpose of recovering camphor from scrap celluloid or the like. According to one of these methods the scrap celluloid is treated with an organic solvent or solvents whereby the camphor is dissolved out, but this method is expensive and generally inefficient owing to the cost of the solvents, etc. According to another method the nitrocellulose is decomposed as by the action of caustic alkali, and the camphor steam distilled from the batch. This method has the disadvantage that it requires a large amount of alkali and the nitrocellulose is decomposed or destroyed so that it is practically worthless. According to a third method the scrap celluloid is merely subjected to steam distillation. This leaves the nitrocellulose undecomposed, but the process is long and tedious and results in the use and condensation of excessive quantities of steam and also considerable portions of the camphor usually remain unremoved. Also to hasten the process high temperatures are frequently employed which tend to cause local overheating which may result in combustion of the celluloid resulting in explosions or fires.

The main object of the present invention is to provide a process in which no large part of the nitrocellulose is decomposed or destroyed and in which it is left as a valuable by-product which may be used as a base for making nitrocellulose lacquers, pyroxylin varnishes and other products, and at the same time the process is simple, cheap and efficient.

I have discovered that if suitable scrap celluloid or the like be subjected to steam distillation in an alkaline solution, but with the strength of the solution such that no substantial or large part of the nitrocellulose is decomposed thereby, that the distillation of camphor from the celluloid is not only rapid and inexpensive, but also the nitrocellulose, or the greater part thereof, is left undecomposed and in very desirable form for use as a base for making lacquers, varnishes and similar products.

In carrying out the invention in a preferred form thereof, I cut up the scrap celluloid or the like into pieces of about $\frac{1}{32}$ inch in thickness or less. Such pieces in the form of shavings or otherwise are then put into a suitable vessel containing a solution of caustic soda, the quantity of solution being such that it is sufficient to cover the scrap celluloid in the vessel. The strength of the solution should be such that no substantial or large part of the nitrocellulose of the celluloid is decomposed or destroyed. That is, the amount of caustic used is a relatively small proportion of that required to decompose the entire amount of the celluloid. For this purpose I prefer to use an amount of caustic soda which is equal to about 3% to about 12% of the weight of the celluloid. I then conduct steam into the batch in the vessel so that the batch is subjected to steam distillation and camphor will be distilled off from the celluloid with the steam. A suitable condenser is connected to the vessel to collect and condense the camphor and steam and the camphor so collected may be easily separated from the condensed water in any well known or suitable manner.

If desired, superheated steam may be used. Also instead of using caustic soda, caustic potash may be used. Also other alkaline solutions including solutions made up of salts of alkaline metals, such as sodium carbonate may be used, care being taken that the solution is such that it will not decompose any substantial or large part of the nitrocellulose or "salt out" any substantial portion thereof. However, the caustic alkalies are much preferred.

By my method it is possible to recover from scrap celluloid and the like substantially all the camphor therein, in a most cheap, quick and efficient manner. A small amount of camphor is preferably left in the remaining nitrocellulose, such as from 5% to 8% based on the weight of the nitrocellulose, as I find this renders the resulting nitrocellulose more suitable and adapted for making better nitrocellulose lacquers and other products, but the amount of camphor left in should be less than one-half the original content.

While I have described my improvements in great detail and with respect to a preferred embodiment thereof, I do not desire to be limited to such details or embodiments since many changes and modifications may be made and the invention embodied in widely different forms without departing from the spirit and scope of the invention in its broader aspects. Hence I desire to cover all modifications, forms, and embodiments, coming within the language or scope of any one or more of the appended claims.

What I claim as new and desire to secure by Letters Patent, is:

1. The method of recovering camphor from celluloid and the like which consists in placing the celluloid or the like in an alkaline solution, the strength of said solution being such that the greater portion of the nitro-cellulose is not decomposed thereby, and subjecting the batch to steam distillation whereby camphor is distilled off from the celluloid or the like.

2. The method of recovering camphor from celluloid or the like which consists in steam distilling camphor from the celluloid or the like in a bath of caustic alkali solution, the strength of said solution being such that the greater portion of the nitro-cellulose is not decomposed thereby.

3. The method of recovering camphor from celluloid or the like which consists in placing the celluloid or the like, cut up into pieces of about $\frac{1}{32}$ inch in thickness or less, in an alkaline solution, the strength of said solution being such that no substantial portion of the nitro-cellulose is decomposed thereby, and passing steam into the batch to subject the same to steam distillation to distill off camphor therefrom.

4. The method of recovering camphor from celluloid or the like which consists in placing the celluloid or the like, cut up into pieces of about $\frac{1}{32}$ inch in thickness or less, in a solution of caustic alkali, the strength of said solution being such that the greater part of the nitro-cellulose is not decomposed thereby, and subjecting the batch to steam distillation whereby camphor is distilled off from the celluloid or the like.

5. The method of recovering camphor from celluloid or the like which consists in placing the celluloid or the like, cut up into pieces of about $\frac{1}{32}$ inch in thickness or less in a solution of caustic alkali, the strength of said solution being such that no large part of the nitro-cellulose is decomposed thereby, and passing steam into the batch to subject the same to steam distillation to distill off camphor from the celluloid or the like, and condensing the camphor distilled off.

6. The method of recovering camphor from celluloid or the like which consists in steam distilling camphor from the celluloid or the like in a bath of caustic alkali solution, the amount of caustic alkali in the solution being equal to about 12% or less of the weight of the celluloid being treated.

In testimony whereof I have signed my name to this specification.

ALEXANDER FRIEDEN.